United States Patent [19]

Algrim et al.

[11] Patent Number: 4,636,437

[45] Date of Patent: Jan. 13, 1987

[54] GLASS FIBER SIZE AND IMPREGNANT COMPOSITIONS

[75] Inventors: Donald J. Algrim, Columbus; Donn R. Vermilion; Donald J. Hammond, both of Newark; Richard M. Haines, Warsaw, all of Ohio

[73] Assignee: Owens-Corning Fiberglas Corporation, Toledo, Ohio

[21] Appl. No.: 668,112

[22] Filed: Nov. 5, 1984

[51] Int. Cl.$^4$ .............................................. B32B 9/00
[52] U.S. Cl. .................................. 428/391; 428/392; 524/265; 524/517
[58] Field of Search ............................... 428/391, 392

[56] References Cited

U.S. PATENT DOCUMENTS

| | | | |
|---|---|---|---|
| 3,424,608 | 1/1969 | Marzocchi et al. | 117/72 |
| 3,816,235 | 6/1974 | Lin | 524/108 |
| 3,900,679 | 8/1975 | Marzocchi | 428/391 |
| 3,904,805 | 9/1975 | Johnson et al. | 428/391 |
| 3,922,406 | 11/1975 | Bell et al. | 428/391 |
| 4,107,117 | 8/1978 | Lin et al. | 428/378 |
| 4,145,494 | 3/1979 | Neubert | 526/80 |
| 4,240,944 | 12/1980 | Temple | 428/391 |
| 4,341,674 | 7/1982 | Vermilion et al. | 428/378 |
| 4,518,653 | 5/1985 | McWilliams et al. | 428/391 |

OTHER PUBLICATIONS

"The Chemistry of Scripset Resins", by Monsanto, No. 6475, pp. 2–5.

"Polyvinylpyrrolidone", Reprinted from Handbook of Water-Soluble Gums and Resins, McGraw-Hill Book Company, Chapter 21, pp. 21-1 through 21-3.

*Primary Examiner*—Joseph L. Schofer
*Assistant Examiner*—Bernard Lipman
*Attorney, Agent, or Firm*—Ronald C. Hudgens; Greg Dziegielewski; Paul N. Kokulis

[57] ABSTRACT

A coating composition substantially prevents fraying of glass fiber yarn packages. The composition is composed of an aqueous solution of a resin formed of the hydrolysis product of a copolymer of vinyl aromatic monomer and maleic anhydride, an organo silane glass fiber anchoring agent and an effective amount of a water-soluble pyrrolidone-containing polymer sufficient to form a protective film over the glass fiber.

11 Claims, No Drawings

GLASS FIBER SIZE AND IMPREGNANT COMPOSITIONS

FIELD OF INVENTION

The present invention generally relates to size and impregnant compositions. More particularly, the present invention relates to size and impregnant compositions finding particular utility when sequentially applied as thin coatings to glass yarns used to reinforce elastomeric products such as vehicular tires, drive belts, pulley belts or the like.

BACKGROUND AND SUMMARY OF THE INVENTION

Bare glass fibers are substantially smooth rod-like members having surfaces which are highly hydrophilic in nature and thus will not typically exhibit a bonding relationship with elastomeric materials sufficient to provide reinforcement properties thereto. That is, the lack of bonding between the bare glass fibers and the elastomeric material causes the glass fibers and elastomeric material to separate from one another and thus are not useful for the manufacture of glass fiber-reinforced products. It is conventional therefore to apply a thin layer of a size composition to the surfaces of the bare glass fibers which is compatible with and serves to improve the bonding relationship between the glass fibers and the elastomeric material.

The thin layer of size composition serves an additional beneficial function. During processing of the glass fibers into a form suitable for use as reinforcement for elastomeric products, the fibers are exposed to abrasive contact with the structural components utilized during processing. The size composition layer therefore also serves to protect the underlying bare glass fiber from abrasive damage which could otherwise occur during processing.

Glass fibers therefore are typically sized as formed, collected into a strand and the strand is then wound around a take-up bobbin to form a substantially cylindrical package (conventionally termed a "yarn package"). The yarn package is then air dried or subjected to elevated temperatures so as to dry the size composition applied to the surfaces of the plural glass fibers forming the strand. In this regard, reference is made to U.S. Pat. No. 3,816,235 which is incorporated expressly hereinto.

The dried and sized strand is then usually unwound from the yarn package and brought into contact with an impregnant solution of resorcinol-formaldehyde resin in combination with various latexes compatible with the size composition and the elastomeric material. The impregnated strand is again dried so as to cure and set the impregnant on the external surface of the glass strand to ensure that the individual sized glass fibers of the strand are adhered one to another. Subsequent twisting of the cured impregnated strands produces a glass fiber suitable for subsequent forming into cloth, rope, cord or the like to reinforce elastomeric products.

Prior to actual use, however, the impregnated glass strands are typically subjected to storage and/or shipping. The impregnated glass strands are therefore potentially exposed to ambient conditions which could deleteriously affect their properties (such as tensile strength) to such a degree that their use as a reinforcing medium for elastomeric products would be seriously impaired. The size and impregnant system of the present invention promotes the durability of glass strands coated therewith by maintaining the durability (i.e., minimizing tensile strength loss) thereof when subjected to potentially harmful ambient conditions. As used herein, the term "durability" is understood to mean the percent loss in tensile strength when an impregnated glass fiber is exposed to an environment of 125° F. at 90% relative humidity for a period of two weeks. It has been discovered that particularly favorable durability properties for impregnated glass fibers can be achieved utilizing sequentially applied size and impregnant compositions as disclosed herein. Particularly, tensile losses of less than about 10% are achieved when glass fibers are sequentially sized and impregnated with the compositions of this invention.

A further aspect of the present invention resides in the discovery that addition of a pyrrolidone-containing polymer to the size composition substantially prevents fraying of glass fibers at the ends of the yarn package. Since the turns of the glass strands at the ends of the yarn package are not supported by adjacent strand turns, fraying at the ends of the yarn package is sometimes observed. As used herein, the term "fraying" is meant to refer to a quantity of individual fibers in the strand which break and separate from the strand. Fraying of the glass strand at the ends of the yarn package is disadvantageous as breakage of a portion of the individual fibers in the strand will obviously cause a loss in strength to such a degree that the strand (or at least that portion of the strand where fraying has occurred) may not be usable as reinforcement for elastomeric products. The size composition of the present invention solves the frayinq problem described above by the addition of a water soluble pyrrolidone-containing polymer which, upon heat curing, migrates to the exterior portions of the yarn package including the ends thereof to form a protective film over the individual glass fibers of the strand which substantially prevents fraying.

According to this invention therefore, there is provided a glass fiber having a first resinous coating formed by drying an aqueous size composition of the hydrolysis product of a copolymer of a vinyl aromatic monomer and maleic anhydride and a glass fiber anchoring agent in the form of an organo silicon compound. Preferably a sufficient amount of a pyrrolidone-containing polymer is present in the size composition to form a protective film on the coated surface of the glass fiber to prevent "fraying".

The sized glass fiber is then coated with an aqueous composition comprising a vinyl-pyridine terpolymer, a blend of emulsifiable mineral oils, silica derivatives and esters, a recorcinol-formaldehyde resin, a polybutadiene latex and wax emulsion wherein the vinylpyridine terpolymer and polybutadiene latex are each emulsified with a synthetic anionic surfactant having sulfate, sulfonate or sulfosuccinate groups.

Any suitable glass fiber is usable with the size and impregnant compositions of the present invention. The term "glass fibers", as used herein shall mean fibers formed by attenuation of one or more streams of molten glass and to strands formed when such glass fiber filaments are gathered together in forming. The term shall also mean yarns and cords formed by plying and/or twisting a multiplicity of strands together and to woven and non-woven fabrics which are formed of such glass fiber strands, yarns or cords. Preferably, the size and impregnant compositions of the present invention are usable with E-type fibers having a diameter in the range of from about 0.35 to about 0.50 mil.

The resins employed in the practice of this invention are commercially available in solutions which can be simply blended with other components in the preparation of the compositions embodying the features of the present invention.

DETAILED DESCRIPTION OF THE PREFERRED EXEMPLARY EMBODIMENTS

A. The Size Composition

Any suitable hydrolysis product of a copolymer of a vinyl aromatic monomer and maleic anhydride can be used in the practice of this invention. Particularly preferred are hydrolyzed copolymers of a vinyl aromatic monomer and maleic anhydride wherein the vinyl aromatic monomer is styrene, the copolymers having molecular weights in the range of about 25,000 to about 50,000. Such copolymers are commercially available from Monsanto Corporation under the trade name "Scripset". More particularly preferred are the half amide/half ammonium salt hydrolysis product of a copolymer of styrene and maleic anhydride having the formula:

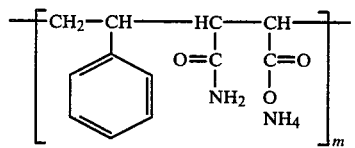

wherein m is an integer. Copolymers of the above formula are commercially available from Monsanto Corporation under the trade name "Scripset 720" and have a molecular weight of about 50,000.

The size composition is formulated to include at least one glass fiber anchoring agent in the form of an organo silicon compound. Use can be made of a wide variety of silicon containing coupling agents familiar to those skilled in the art. Preferred for this purpose are organo silicon compounds which include organo silanes containing one to three readily hydrolyzable groups, such as halogen (bromine, chlorine, fluorine or iodine) or alkoxy having one to six carbon atoms, such as methoxy, ethoxy, propoxy, butoxy, etc., and containing at least one organic group attached directly to the silicon atom, with any remaining valences on the silicon atom being taken up by hydrogen. In aqueous solution, such silanes tend to hydrolyze to form the corresponding silanols and/or siloxanes, and hence the anchoring agent is present in the aqueous size composition of the invention as the silane, silanol and/or siloxane.

The organic group or groups attached at the silicon atom can be any of a variety of groups including alkyl having 1–10 carbon atoms, such as methyl, ethyl propyl, hexyl, etc.; alkenyl containing 2–8 carbon atoms, such as vinyl, alkyl, etc.; cycloalkyl having 4–8 carbon atoms, such as cyclopentyl, cyclohexyl, etc.; aryl containing 6–15 carbon atoms, such as phenyl, naphthyl, benzyl, etc. and the halogen, amino, hydroxy, mercapto, glycidoxy or epoxy substituted derivatives thereof. It will be understood that wherein organo silane contains more than one organic group, the various organic groups attached to the silicon atom can be the same or different from each other.

Representative of the compounds falling within the above group are ethyldichlorosilane, propyltrichlorosilane, n-butyl-trimethoxysilane, gamma-aminopropyltrimethoxysilane, delta-aminobutyltriethoxysilane, bis(-gamma-aminopropyl)dimethoxysilane, delta-aminobutylethyldimethoxysilane, beta-hydroxyethyltriethoxysilane, glycidoxypropyltrimethoxysilane, gamma-chloropropyl-trichlorosilane, vinyldichlorosilane, gamma-aminoallytrimethoxysilane, beta-aminovinyltriethoxysilane, 3,4-epoxycyclohexyltrimethoxysilane, 3-amino-cyclohexylethyltriethoxysilane, paraaminophenyltriethoxysilane, methacryloxypropyltrimethoxysilane, N-(beta-aminoethyl)-gamma-aminopropyltrimethoxysilane, gamma-mercapropropyltriethoxysilane, gamma-hydropropyltrimethoxysilane, as well as a variety of others. In general, those silanes preferred are those in which at least one group is substituted by at least one amino group.

Particularly preferred organo silanes falling within the above description are gamma-aminopropyltriethoxy silane (commercially available from Union Carbide under the trade name "A 1100") and/or N-(beta-aminoethyl)-gamma-aminopropyltrimethoxysilane (commercially available from Union Carbide under the trade name "A 1120"). The organo silane should be present in an amount between about 0.3% to about 1.0% by weight of the size composition.

As mentioned above, one aspect of the present invention is the use of a pyrrolidone-containing polymer which forms a film on the sized glass fibers to thus prevent fraying of a strand containing plural sized fibers. Preferred for this invention is a homopolymer of water-soluble polyvinylpyrrolidone (commercially obtained from GAF Corporation under the trade name PVP-K90) having a molecular weight of about 90,000. Vinylpyrrolidone could also be copolymerized with other suitable unsaturated monomers in a manner well known to those in this art. Representative monomers include halogen or alkyl-substituted dienes such as butadiene, alkenes such as ethylene, propylene, etc. or methyl or ethyl methacrylates. The resulting copolymer must however be water soluble. Water solubility is an important aspect of the pyrrolidone-containing polymer component of this invention as water solubility enables migration of the pyrrolidone-containing polymer to the outer surface of the sized glass fiber so as to form a protective film covering thereover when the glass fiber is dried. That is, the pyrrolidone-containing polymer migrates with water due to its water solubility towards the heat source during drying of the glass fiber and forms a protective film over the glass fiber upon drying.

The pyrrolidone-containing polymer should be present in the size composition in an amount not less than about 0.2% by weight and not greater than about 0.4% by weight. When used in amounts less than about 0.2% by weight it has been found that insufficient film-forming has occurred on the surface of the sized glass fiber thereby resulting in deleterious fraying predominantly at the ends of the yarn package. On the other hand, greater than about 0.4% by weight of pyrrolidone-containing polymer in the size composition decreases the ability of the glass fiber to be rewetted as by a latex derivative impregnant solution and thus insufficient application of the latex derivative impregnant composition results.

Although not essential to the practice of the present invention, it is preferable to include at least one emulsifying agent in the size composition which promotes the overall stability thereof and the wetting of the strand by lowering the surface tension of the size composition. Preferred for this purpose are the polyoxyethylene derivatives of alkyl substituted phenols wherein the alkyl group contains six to twenty carbon atoms. A particular example of a suitable emulsifying agent is a nine carbon alkyl substituted phenol commercially available from GAF Corporation under the trade name "Igepal C0630".

Any suitable lubricating agent can be employed in the practice of this invention. Particularly preferred are sulfonated mineral oils commercially available from Emery Chemical under the trade name "Emerlube 7440".

As will be appreciated by those skilled in the art, solubilizing agents should be present in the size composition to maintain the polymer resin component in solution so that coating upon the glass fiber surface can be effected. Any suitable organic and/or inorganic solubilizing agents nonreactive with the polymer resin component can be employed for this purpose which maintain the size solution pH in the range of between about 10.0 to about 11.0. Particularly preferred are tertiary organic bases such as triethylamine and inorganic bases such as sodium hydroxide. To reduce odors in the processing environment it is preferred to use a mixture of organic and inorganic bases as solubilizing agents.

When applied to glass fibers, the size composition of this invention will typically comprise about 0.35% by weight of the glass fibers.

B. The Impregnant Composition

It has been discovered that a select class of resorcinol formaldehyde impregnates wherein the polybutadiene homopolymer and the butadine-styrene-vinylpyridene terpolymer are each emulsified with synthetic anionic surfactants having sulfate, sulfonate or sulfosuccinate groups promote particularly favorable durability properties of impregnated glass fibers when used as a second coating over the size composition described above. Particularly, when a second coating of an impregnant wherein the polybutadiene homopolymer and the butadiene-styrene-vinylpyridine terpolymer are each emulsified with synthetic anionic surfactants having sulfate, sulfonate or sulfosuccinate groups is applied over a first coating of a resin formed by drying an aqueous size composition of the hydrolysis product of a copolymer of a vinyl aromatic monomer and maleic anhydride, tensile losses of less than about 10% are achieved when the sized and impregnated glass fibers are exposed to an environment of 125° F. at 90% relative humidity for a period of two weeks. Representative of the types of impregnants useable in combination with the size composition disclosed herein are those described in U.S. Pat. No. 4,341,674 to Vermilion et al (the entire disclosure being expressly incorporated hereinto by reference).

Any suitable resorcinol-formaldehyde resin pre-condensate can be employed. Preferably, it will be produced employing from about 0.2 to about 0.8 mole of formaldehyde per mole of resorcinol and will contain a total solids content of about 75 weight percent. The resorcinol-formaldehyde resin pre-condensate will be employed in the composition in an amount within the range of from about 3.0 to about 10.0 weight percent of the residue produced by drying the composition and more preferred in an amount of about 5.0 weight percent.

A suitable pre-condensate can be formed as demonstrated hereinafter and suitable materials are available commercially, such as "Schenectady SRF 1524" available from Schenectady Chemicals.

Any suitable vinylpyridine terpolymar which is emulsified with a synthetic anionic surfactant having sulfate, sulfonate or sulfosuccinate groups can be used in accordance with the present invention. Advantageously, the terpolymer is formed directly by emulsion polymerization according to known techniques. Preferably, the vinylpyridine terpolymer will be a terpolymer latex of butadiene, styrene and vinylpyridine comprised of about 10-15% by weight of vinylpyridine, about 15% by weight of styrene and the balance being butadiene. The vinylpyridine will preferably be employed in an amount between about 15-60% by weight of the residue produced by drying the composition.

Particularly preferred vinylpyridine terpolymers emulsified in synthetic anionic surfactants having sulfate, sulfonate or sulfosuccinate groups are "Gentac 134" and "Gentac 135" available from DiversiTech General Corporation (formerly General Tire and Rubber Company) of Akron, Ohio. These materials respectively are comprised of 15% and 11% by weight vinylpyridine, 15% and 15% by weight styrene, and 70% and 76% by weight butadiene.

Any suitable polybutadiene latex which is also emulsified with a synthetic anionic surfactant having sulfate, sulfonate or sulfosuccinate groups can be employed. Preferably, the polybutadiene latex will have an average molecular weight of between 10,000 to about 2,000,000. The butadiene latex will be present in the impregnant composition in an amount between 30 to 80% by weight of the residue produced by drying the composition. The solubility of the butadiene latex when a dry film thereof is covered with toluene for four days is preferably in the range of 18% to 50% solids in an aliquot of the toluene. In order to provide advantageous properties to elastomeric products such as tires when impregnated glass fibers of this invention are used as tire cords, the butadiene latex should preferably have an inherent viscosity of at least about 0.55 and preferably not greater than 2.0, with about 0.58 to about 0.70 being particulary preferred.

As used herein, the term "inherent viscosity" is meant to refer to the inherent viscosity of a toluene solvent when a film of the butadiene latex is covered with toluene for a period of four days as expressed by the formula:

$$\text{INHERENT VISCOSITY} = \text{LOG}_e \frac{\text{RELATIVE VISCOSITY}}{\text{CONCENTRATION}}$$

where "relative viscosity" is equal to the viscosity of the toluene solution covering rhe butadiene latex for a period of four days divided by the viscosity of pure toluene, and where "concentration" is the percent solids of the butadiene latex in the toluene solution.

One particularly preferred polybutadiene latex emulsified with the synthetic anionic surfactants of the type called for herein is "Genflo 8057" available from DiversiTech Corporation (formerly General Tire and Rubber Company) of Akron, Ohio.

Suitable anionic surfactants of the type called for herein include sulfates, sulfonates and sulfosuccinates of sodium, potassium or ammonium with sodium dodecyl sulfonate and sodium decyl sulfate being particularly preferred.

Any suitable wax emulsion can be employed. One such wax emulsion typically contains about 55% solids and is comprised of about 37.5% by weight microcrystalline paraffin wax ("Shell Wax 270" available from Shell Oil Company), 12.5% by weight partially-oxidized wax ("Cardis 370" available from Western Petro Company), 2.0% by weight oleic acid, 2.0% of potassium hydroxide (45% solution) and the balance being water.

Any suitable thickening agent can be employed. Preferred thickening agents are copolymers and terpolymers of methacrylic acid and other suitable monomers, such as butadiene. The thickening agent is employed in an amount sufficient to increase the viscosity of the impregnant solution to aid in processing and will typically be employed in an amount of between about 0.1 to about 1.0 weight percent of the residue produced by drying the composition. A particularly suitable thickening agent is "Tychem 68-705", commercially available from Reichhold Polymers Inc., Dover, Del.

Any suitable blend of emulsifiable mineral oils, silica derivatives, and esters can be employed. Preferably, it will be employed in an amount of from about 0.1 to about 1.0 weight percent of the residue produced by drying the composition. A particularly suitable blend of emulsifiable mineral oils, silica derivatives and esters is designated "Quaker MRL-1" available from Alkaril Chemical Company of Atlanta, Ga.

The impregnant of this invention will also preferably contain about 1 weight percent formaldehyde about 0.9 weight percent ammonium hydroxide and about 0.1 weight percent potassium hydroxide.

When used as an impregnant for glass fibers, the dried residue will typically comprise about 17.0% by weight of the glass fibers.

The following nonlimiting examples will provide the reader with a more detailed understanding of the invention, which examples are based upon the preparation of 100 parts by weight of the wet compositions.

EXAMPLE I

A preferred resin size composition is prepared by initially charging 35 parts of demineralized water into an agitated main mix tank. The following premixes are separately accomplished:

Premix I: An agitated premix tank is charged with 14 parts of hot (140 to 150° F.) demineralized water. An alkyl-substituted phenol wherein the alkyl has nine carbon atoms (Igepal C0630) is added to the demineralized water in an amount of 0.78 parts. The mixture is agitated for five minutes and added to the demineralized water in the main mix tank.

Premix II: To 6 parts of demineralized water there is added 0.19 part of triethylamine and the mixture is agitated for one minute before addition to the main mix tank.

Premix III: To 9 parts of demineralized water in an agitated premix tank there is added 3.15 parts of Scripset 720 (25% resin solution). Agitation is continued for two minutes prior to addition to the main mix tank.

Premix IV: 0.94 part of a sulfonated mineral oil (Emerlube 7440) is added to 9 parts of demineralized water and agitated for two minutes prior to addition to the main mix tank.

Premix V: A 28% solution of ammonium hydroxide in the amount of 0.47 part is added to 6 parts of demineralized water and agitated for one minute prior to addition to the main mix tank.

Premix VI: 0.84 part and 0.13 part of commercially available organo silane compounds A1100 and A1120 are respectively added to 15 parts of demineralized water and agitated for 30 seconds prior to addition to the main mix tank.

The previously-added 35 parts of demineralized water and Premixes I-VI are agitated in the main mix tank for fifteen minutes after an additional amount of demineralized water is added thereto as needed to formulate 100 parts of the size composition. The percent solids in main mix tank will be $3.0 \mp 0.15$ and the pH will be in the range of 10.0-11.0.

EXAMPLE II

Formulation of a preferred impregnant composition is as follows:

A resorcinol-formaldehyde resin premix solution is prepared by charging 3.5 parts of deionized water into a premix tank and adding 3.05 parts of commercial resorcinol-formaldehyde premix (SRF-1524). The mixture is agitated for three minutes. Formaldehyde in an amount of 0.9 part is added and agitation is continued for thirty minutes. Thereupon, 0.18 part of potassium hydroxide is added followed by the addition of 3.05 parts deionized water and agitation was continued for 20 minutes from the addition of the potassium hydroxide.

Into a mix tank, 25.45 parts of a commercial butadiene-styrene vinylpyridine latex produced by emulsion polymerization with a sulfate-containing surfactant (Gentac 134) and 4.88 parts of a wax emulsion (CX 364) are introduced. The mixture is agitated for 3 minutes. Ammonium hydroxide in the amount of 0.92 parts is added to the mixture and agitation continued for three minutes. 57.26 parts of a commercial polybutadiene latex produced by emulsion polymerization with a sulfate-containing surfactant (Genflo-8057) is then added to the mix tank under agitation.

The previously-prepared resorcinol-formaldehyde resin premix is then introduced into the mix tank at the end of the 20 minute post potassium hydroxide addition time over a period of 4 to 6 minutes under agitation. Thereafter, 0.35 part of a thickening agent (Tychem 68-705) is added to the main mix tank under agitation followed by the addition of a blend of emulsifiable mineral oils, silica derivatives and esters (Quaker MLC-1). Agitation of the mixture continues for fifteen minutes.

After aging for about three days, the impregnant is suitable for use and will have a pH between about 10.0-11.5, a viscosity between 200-1000 cps, and a total solids content of between 42.0-44.0 weight percent.

The impregnant of this invention is applied to glass fibers in the usual manner, for example, employing the procedure and apparatus disclosed in U.S. Pat. No. 3,424,608 to Marzocchi et al. After application of the impregnant to the glass strand, the impregnant is air dried and cured in the usual manner, that is, for example, at 500° to 650° F. for a period of about 5 to 10 seconds.

EXAMPLE III

To determine the durability of various size and impregnant compositions, J15 3/0 glass fiber strands are sequentially applied with coatings of size and impregnant compositions according to conventional techniques to achieve the following impregnated glass strand samples:

Sample No. 1 (control):

A size composition in accordance with U.S. Pat. No. 3,861,235, incorporated expressly hereinto, and an impregnant composition (hereinafter referenced as "IC(control)") in accordance with U.S. Pat. No. 4,107,117, incorporated expressly hereinto.

Sample No. 2:

A size composition in accordance with Example I herein and an impregnant composition designated IC(control).

Sample No. 3:

A size composition in accordance with Example I herein and an impregnant composition in accordance with Example II herein.

Each sample is tested for tensile strength after curing and the data is recorded as "Strength 1". Thereafter, each sample is then subjected to an environment controlled at 125° F. and 90% relative humidity for two weeks. Each sample is again tested for tensile strength and the data is recorded as "Strength 2". The results appear below in TABLE 3.

TABLE 3

| SAMPLE NO. | STRENGTH 1 (POUNDS-FORCE) | STRENGTH 2 (POUNDS-FORCE) | DURABILITY (% TENSILE LOSS) |
|---|---|---|---|
| 1 | 184 | 174 | 5.0 |
| 2 | 186 | 104 | 44.0 |
| 3 | 183 | 181 | 1.1 |

From the above, it is evident that when impregnants having the polybutadiene homopolymer and vinylpyridine terpolymer emulsified with a synthetic anionic surfactant having sulfate, sulfonate or sulfonsuccinate groups are used as a second coating over a glass fiber sized with the size composition of the type disclosed in Example I herein, particularly favorable tensile losses of less than 10% are achieved.

EXAMPLE I

To determine the adhesive characteristics of the size and impregnant composition system of this invention, Sample Nos. 1 and 3 of Example III above are tested in accordance with the Goodyear Hot "U" testing procedure with the following results:

| | ADHESION (POUNDS-FORCE) |
|---|---|
| Sample 1: | 34.58 |
| Sample 3: | 36.23 |

EXAMPLE V

To determine the efficacy of the glass fibers coated with the size and impregnant compositions of the present invention for use as reinforcement for vehicular tires, Samples Nos. 1 and 3 of Example III above are formed into vehicular tires and are mounted onto standard factory autobiles. The automobile is loaded with lead weights to achieve a weight equivalant to 100% of the tire and rim rating. The automobiles are then maneuvered around a figure-eight course having circular centerpoints spaced apart by about 66 feet. The automobile is accelerated to a speed whereby one lap of the figure-eight course is traveled in approximately 20 seconds. A total time on the course for each tire is three hours after which the tires are removed from the automobile and the glass tire cord is exposed. The number of glass tire cord breaks is subjectively determined using a breakage scale of 1 (severe cord breakage) to 7 (no cords broken) with the following results:

| | BREAKAGE SCALE |
|---|---|
| Sample 1: | 3.0 |
| Sample 3: | 5.9 |

EXAMPLE VI

The following data demonstrate the effect of the addition of a pyrrolidone-containing polymer. Five solutions (A-E) of a size composition are prepared in accordance with Example I above with the exception that polyvinylpyrrolidone (PVP) is added in weight percent based on the total weight of the size composition as follows:

| | A | B | C | D | E |
|---|---|---|---|---|---|
| wt. % PVP | 0 | .2 | .3 | .4 | .5 |

The size solutions A-E are each coated upon a glass strand formed of multiple glass filaments in the manner described in U.S. Pat. No. 3,816,235. The sized strands are formed into respective substantially cylindrical yarn packages A-E corresponding to the size solutions A-E and oven dried. The dried yarn packages are then visually inspected for fraying at the ends of the yarn package with the following results:

| | A | B | C | D | E |
|---|---|---|---|---|---|
| Amt. of End Fraying | substantial | None | None | None | None |

The glass strands of yarn packages A-E are then brought into contact with an impregnant composition designated "IC(control)" in Example III herein. The impregnated strands of yarn packages A-E are cured in the usual manner, e.g. at 500° to 650° F. for a period of about 5 to 10 seconds and the cured impregnated strands are visually inspected to determine the amount of impregnant solution pick-up (i.e. wetability). The results are shown below:

| | A | B | C | D | E |
|---|---|---|---|---|---|
| Wetability | Good | Good | Good | Fair | Poor |

The above demonstrates that addition of at least 0.2% polyvinylpyrrolidene in the size solution substantially prevents end fraying and that addition of greater than 0.4% by weight of polyvinylpyrrolidene impairs the ability of sized glass strands to be impregnated with a latex derivative solution.

While the present invention has herein been described in what is presently conceived to be the most preferred exemplary embodiments thereof, those in the art may recognize that many modifications may be made which modifications shall be accorded the broadest interpretation of the appended claims.

What is claimed is:

1. A glass fiber having a thin coating on the surfaces thereof, said coating being a dried resin residue of a coating composition comprising an aqueous solution consisting essentially of (a) the hydrolysis product of a copolymer of a vinyl aromatic monomer and maleic anhydride, (b) from about 0.3 to about 1%, by weight of said composition of an organo silane glass fiber anchoring agent and (c) from about 0.2 to about 0.4% by weight of said composition, of a film-forming water-soluble pyrrolidone-containing polymer, the amount of (c) being sufficient to form a protective film over the glass fiber to prevent fraying while retaining rewettability of said fiber by latex impregnant solution subsequently applied thereto.

2. A glass fiber as in claim 1 wherein said pyrrolidone containing polymer is a water-soluble homopolymer of polyvinylpyrrolidone.

3. A glass fiber as in claim 1 wherein said vinyl aromatic monomer is styrene.

4. A glass fiber as in claim 3 wherein said anchoring agent is selected from the group consisting of an organo silane having 1 to 3 readily hydrolyzable group and containing at least one organic group attached directly to the silicon atom, the corresponding silanols and poly sioxanes.

5. The glass fiber as in claim 4 wherein said anchoring agent is gamma-aminopropyltriethoxysilane.

6. The glass fiber as in claim 4 wherein said anchoring agent is N-(beta-amino)-gamma-aminopropyltrimethoxysilane.

7. The glass fiber as in claim 4 wherein said anchoring agent includes gamma-aminopropyltriethoxysilane and N-(beta-aminoethyl)-gamma-aminopropyltrimethoxysilane.

8. The glass fiber as in claim 1 wherein copolymer has the formula:

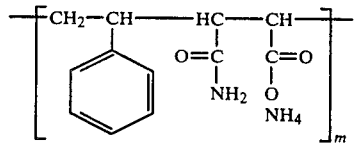

where m is an integer such that said copolymer has a molecular weight in the range of between about 25,000 to about 50,000.

9. The glass fiber as in claim 1 further comprising a lubricating agent selected from the group consisting of sulfonated mineral oils.

10. Glass fiber as in claim 1 having a second coating upon said first-mentioned coating, said second coating being a resin residue formed by removing water from an aqueous solution of a vinylpyridine terpolymer, a blend of emulsifiable mineral oils, silica derivatives and esters, a resorcinol-formaldehyde resin, a polybutadiene latex and a wax emulsion, and wherein said vinylpyridine terpolymer and said polybutadiene latex are each emulsified with a synthetic anionic surfactant having a sulfate, sulfonate or sulfosuccinate group.

11. Glass fiber as in claim 10 which exhibits a tensile loss of less than about 10% when exposed to an environment of 125° F. at 90% relative humidity for two weeks.

* * * * *